April 15, 1947. V. L. WEAVER 2,419,100
DYNAMOMETER TYPE ELECTRICAL MEASURING INSTRUMENT
Filed May 25, 1945
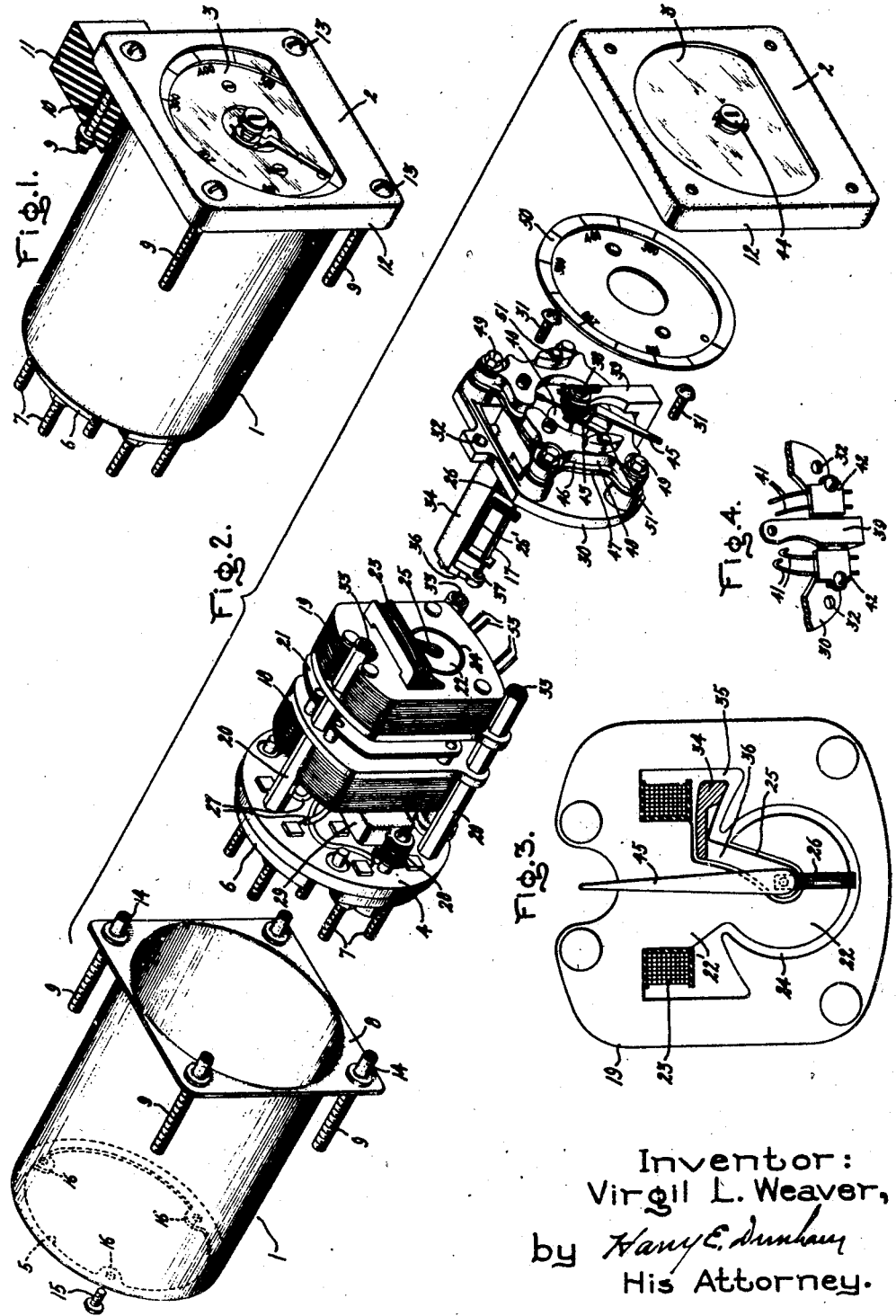
Inventor:
Virgil L. Weaver,
by Harry E. Dunham
His Attorney.

UNITED STATES PATENT OFFICE 2,419,100

DYNAMOMETER TYPE ELECTRICAL MEASURING INSTRUMENT

Virgil L. Weaver, Greenwood, Mass., assignor to General Electric Company, a corporation of New York Application May 25, 1945, Serial No. 595,720

4 Claims. (Cl. 171—95)

My invention relates to certain structural improvements in electrical measuring instruments with respect to assembly and disassembly, and one object is to provide an instrument of the dynamometer type having a moving element with one or more moving coils rotatable about one side and threaded by a fixed magnet core, wherein the entire moving element and its jeweled mounting, lead-in spirals, pointer, etc., are removable from the core structure as a unit without disassembly of either core structure or moving element assembly. Another object of the invention is to accomplish such disassembly operation from the front of the instrument after removing the front cover and scale plate without removing the remainder of the instrument from its casing or disturbing the electrical connections at the back of the instrument. The entire instrument may be removed from its casing from the front by removing the front cover and three holding screws at the back end of the casing.

The instrument is particularly suited for switchboard mounting, and the complete instrument and its manner of mounting on a switchboard are indicated in Fig. 1. Fig. 2 shows a perspective view of the major instrument parts as disassembled. Fig. 3 is an end view of the core structure and armature assembly partially in section which will be referred to in explaining the manner of removing the armature assembly from the core assembly, and Fig. 4 shows a terminal block detail on the armature assembly.

The features of my invention which are believed to be novel and patentable will be pointed out in the claims appended hereto. For a better understanding of my invention, reference is made to the drawing in the following description. The instrument as designed for switchboard mounting is contained within a cylindrical case 1, having a front cover 2 with a viewing window 3 therein. The rear of the casing is closed by the insulating base plate 4 on which the instrument is mounted when the instrument is assembled in the casing as shown in Fig. 1. The base 4 is stepped as shown in Fig. 2 such that its larger part, of a diameter to fit snugly inside the casing, abuts against the inside of a turned-in rim part 5 at the rear of the casing indicated in dotted lines in Fig. 2. A smaller part 6 of the base plate conforms to the shape of the rear opening in case 1 and protrudes through the rear opening in the casing and supports various electrical terminal bolts 7 by means of which the instrument is connected into measuring relation with electrical circuits from the back of the switchboard.

The instrument is firmly secured at its base plate 4 within and to the casing by three screws, one of which is shown at 15, which pass through ears 16 in the rear rim 5 from the rear and screw into the base plate part 4. When the screws 15 are tightened, the base plate part 4 is drawn tightly against the inside of rear rim section 5 of the casing, completely closing the rear of the casing and positioning the instrument centrally within the casing. The front of the casing has an integral, substantially square outline face plate 8 extending outwardly from the cylindrical part, and the four corners of this plate have rearwardly extending bolts 9 fastened therein. The casing may thus be inserted from the front into a circular switchboard opening of a size slightly larger than the cylindrical part 1 of the casing until the plate 8 rests against the front of the switchboard about the opening. The switchboard will have holes 10 drilled therein for the bolts 9 so that the casing may be bolted in place as represented in Fig. 1, where 11 represents a section of the switchboard on which the instrument is mounted.

The front cover 2 has a square shape conforming to the shape of front casing plate 8 and a turned-over rim section 12 which closely fits over the plate 8 and rests against the front of the switchboard. The front cover is held in place by four screws 13 which enter threaded openings in studs 14 made integral with front cover plate 8. The studs 14 preferably extend forward from the heads of bolts 9 which pass through holes in plate 8 with the enlarged bolt heads welded to the front of the plate. A gasket may be used within the cover to seal the front opening against dust.

The instrument shown may be a polyphase alternating current wattmeter having two torque producing elements acting on the same shaft 17. The stationary magnetic core parts of the two elements are represented at 18 and 19. The laminations of these core parts are secured to base 4 by rods 20 which are made in sections and threaded together, and serve also as spacers between the base and core parts and between the core parts and a laminated magnetic shielding member 21 located between the two torque elements. The core parts 18 and 19 are similar and are made up of one-piece laminations as best shown in Fig. 3 and have an inner core part 22 extending from the outer part by a tongue 22' about which the current coil 23 is wound. The tongue 22' and inner core part 22 are generally in the shape of a hook with the radial opening 25 in prolongation with one side of the tongue. The outer yoke surrounds the coil and inner core part 22 and is spaced from the latter by the narrow circular air gap 24 in which the moving coil 26 swings. The air gap 24 and the opening 25 in the hook of the front and rear core elements 19 and 18 are in alignment. The lamina of shield 21 are of the same size and shape as those of the core parts and have the openings 25 in their hook parts and the gap 24 in alignment with the corresponding openings and gaps in the cores 18 and 19. While not shown in Fig. 2, the rear stationary core part 18 will have an energizing coil 23 such as is shown in Fig. 3. These coils are connected to certain of the rear terminal studs through insulated conductors some of which are shown at 27 in Fig. 2. Also mounted on the inside of the base are such resistances 28 or other circuit elements 29 as are needed in the circuits of the particular instrument employed.

The moving element assembly is completely supported from a die-cast frame part 30 which is secured on the forward end of the stationary core assembly by three screws 31 which pass through holes 32 in plate 30 and enter threaded opening 33 in the ends of posts 20. The contacting surfaces between plate 30 and posts 20 are stepped and fitted as indicated about the openings 33 to obtain exact alignment.

Integral with plate 30 is an arm 34 of such shape and position on plate 30 (see Fig. 3) as to pass freely into the aligned openings 35 located between the outer and inner stationary core parts 18 and 19 and shield 21. The arm 34 extends toward the rear a sufficient distance to reach beyond the back core 18, and the back end of extension 34 is provided with an arm 36 which is of such size, shape, and location as to pass freely through the aligned openings 25 in the hook parts of the stationary core structure when the moving element assembly is inserted into place. This arm supports the rear jewel 37 for the shaft 17 of the moving coil armature system at the axial center of core parts 22. The upper or forward jewel screw 38 for the moving coil system is supported in an overhanging arm 39 integral with plate 30. The jewels are thus positioned in axial alignment with the center axial openings of the core parts 18 and 19 and shield 21. The armature shaft 17 is thus rotatively supported in such jewels on such axis. The two armature coils 26 and 26' have one coil side closely adjacent shaft 17 with the opposite sides spaced from the shaft a distance to rotate freely in the air gaps 24 of their respective cores 19 and 18. The armature coils 26 and 26' are positioned along shaft 17 and are of such location and length as to freely encircle the hook-shaped core parts 22 of their respective cores when the armature assembly is in place.

The armature assembly may be inserted into place as represented in Fig. 3 and removed as represented in Fig. 2 only when the coils 26 and 26' are rotated into alignment with the radial opening 25 in the stationary core parts 18 and 19 and in shield 21. This position occurs when the armature is rotated a maximum or near maximum in the counter-clockwise direction and the pointer 45 is in contact or nearly so with arm 39. After thus being inserted into place, the coils are in threading relation with their core parts and may be freely rotated to occupy various positions around the gap 24. A mid-deflection position is represented in Fig. 3. This inserting of the armature into place and removing it without injury is not difficult, but reasonable care should be used to see that the armature is in line with opening 25, that the parts are inserted or withdrawn axially and with the proper alignment of parts. When in place, the inserting and tightening of screws 31 provides the desired exact alignment and positioning of the moving coils in the stationary field for accurate measurement operation. The lead-in spirals for the armature coils are at the front end of the assembly and need no special comment. The mica protective insulating disk for the uppermost spiral may be seen at 40 in Fig. 2. The outer or stationary ends of the spirals are supported and electrically connected to leads 41 fixed in insulating terminal blocks 42 supported on the upper surface of plate 30 on either side of jewel supporting arm 39 as shown in Fig. 4. The lead-in spirals are not depended upon for the zero restoring torque. A spiral spring 43 which may be adjusted by means of a zero adjustment device 44 through the front cover supplies the zero adjustment torque. The shaft 17 also carried the pointer 45 and an aluminum vane which rotates in the gap 46 of damping magnets supported in plates 47 and 48 fastened on the top of plate 30 by bolts 49. The scale plate 50 is secured to plates 48 by screws which enter holes 51.

The armature terminals 41, Fig. 4, are connected to certain of the studs 7 projecting from the rear end of the instrument through wires 53, Fig. 2, and in order to remove the armature assembly from the stationary core structure as shown in Fig. 2, I prefer to disconnect the wires 53 at or near the terminal blocks 42. I find this may be done conveniently from the front of the instrument after removing the front cover and scale plate by the momentary use of a soldering iron, for example. The scale plate may be removed without injury to or removal of the pointer 45 by tipping the scale plate slightly and sliding it off sideways toward and over the projecting end of the pointer.

Having thus described the instrument structure, I will review its main assembly or disassembly features. Assume that the instrument is assembled and mounted on a switchboard as represented in Fig. 1:

1. The instrument may be removed from the switchboard without opening it by taking the nuts from bolts 9 and withdrawing the case from the front.

2. The complete instrument may be removed from its casing by removing the front cover and the three screws 15 from the rear and withdrawing the instrument from the case from the front. If desired, the cover 2 may then be replaced on the casing and left on the switchboard.

3. The complete armature assembly may be removed from the casing, leaving the terminals 7 at the rear of the instrument connected, if desired, by removing the front cover and the scale plate and the screws 31 which hold plate 30 in place. Disconnect the armature coil leads at terminals 42. Align the armature coils with radial opening 25 and withdraw the armature assembly from the front of the casing. This operation does not disturb the armature jeweling, lead-in spirals, magnetic damper, or stationary core structure and this feature is generally applicable to instruments having one, two or more torque elements. Pending return of the armature assembly to the instrument, the front cover may be replaced if desired.

In accordance with the provisions of the patent statutes I have described the principle of operation of my invention, together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. An electrical measuring instrument comprising a stationary magnetic core having an outer yoke part and an inner core part secured to the yoke part by a tongue, the inner core part and the tongue being hook-shaped leaving a radial opening from the center of the inner core part in prolongation with one side of the tongue, a circular flux air gap between the inner core and the outer yoke parts, an energizing coil about the tongue for producing flux across said air gap, an armature assembly structure comprising a supporting plate removably secure to the front end of said stationary magnetic core, a shaft rotatively supported from said plate in axial alignment with the central opening of said inner core part, an armature coil on said shaft with one side adjacent the axis of rotation thereof and of such size and shape as to thread the inner core part with its outer side rotatable in said circular air gap, a front bearing support for said shaft secured to said plate and a rear bearing support for said shaft comprising a supporting member extending to the rear of said plate through and in alignment with the opening between the tongue and outer yoke stationary core parts, and with an arm at the rear of said member extending inward toward the axis of rotation in alignment with the radial opening in said inner core part, whereby when the shaft is rotated to a position where the armature coil is also in alignment with said radial opening the armature coil as thus assembled for rotation may be inserted in or removed from threading relation with said inner core part without disassembly of said armature assembly structure.

2. An electrical instrument structure comprising a cylindrical casing with openings at front and rear, an outwardly projecting plate secured to the cylindrical casing at its front, means for securing said plate to a switchboard through which the cylindrical casing extends, said cylindrical casing having a turned-in rim at its rear reducing the size of such opening, an insulating base member having a front circular part of such dimensions as to fit within the cylindrical casing and a reduced rear portion fitting within the reduced rear opening of the cylindrical casing, means accessible from the rear of the casing for securing said base to the rear of the casing with the reduced rear part of the base extending through and closing the rear opening of the cylindrical casing, an electrical instrument secured to the front of said base within said casing, terminal studs extending through said base for making electrical connection to said instrument from the rear of the casing, and a cover for said casing removably secured to the front plate, said instrument being removable through the front opening when the cover is removed.

3. An electrical measuring instrument having a plurality of torque elements with a common axis of rotation, each comprising a stationary magnetic core made up of one-piece laminations having an outer yoke part and an inner core part connected together by a tongue, the tongue and inner core part being hook-shaped with a radial opening in the inner core part in prolongation with one side of the tongue, and with the outer yoke part and the inner yoke part being separated by a circular flux air gap and with an energizing winding on the tongue to produce a flux across said air gap, the stationary cores of said torque elements being assembled with their radial openings and circular gaps in alignment, an armature coil for each torque element, said armature coils being rotatively supported on the same shaft, a frame removably secured in fixed relation to and at one end of the stationary core assembly, said frame carrying a bearing for the corresponding end of the shaft, said frame having a supporting member extending toward and beyond the other end of such core assembly in alignment with the opening between the tongues and outer yoke parts of the several stationary core structures and an arm on said supporting member beyond such other end projecting to the axis of rotation of said shaft in alignment with the radial openings in the several inner core members for rotatively supporting the other end of said shaft, the several armature coils on said shaft having their inner sides lying adjacent the axis of rotation thereof and of such size and shape as to thread their corresponding inner core parts with their outer sides rotatable in the corresponding circular air gaps, said armature coils being positioned along said shaft in threading relation with their respective inner core parts when such armature assembly is in place and with said armature coils lying in the same plane so as to be rotated to a position in alignment with the radial openings in the inner core parts, lead-in spirals supported on said frame electrically connected to said armature coils, and an adjustable zero return spring for said shaft supported on said frame, said frame and the parts rotatively and otherwise supported thereby and thereon being axially removable as a unit from said stationary core assembly when the armature coils are rotated in alignment with the radial openings in their corresponding inner core parts.

4. A polyphase alternating current measuring instrument having a structure as set forth in claim 3 and provided with stationary magnetic screens supported between adjacent torque elements, said screens having hook-shaped tongue and inner core parts with radial and air gap openings similar to those of the stationary core parts and positioned with a corresponding alignment.

VIRGIL L. WEAVER.

REFERENCES CITED

The following references are of record in the file of this patent:

UNITED STATES PATENTS

| Number | Name | Date |
|---|---|---|
| 1,918,023 | Faus | July 11, 1933 |
| 2,221,643 | Lederer | Nov. 12, 1940 |
| 2,381,329 | Young et al. | Aug. 7, 1945 |
| 2,389,393 | Thomander | Nov. 20, 1945 |

Disclaimer 2,419,100.—*Virgil L. Weaver*, Greenwood, Mass. DYNAMOMETER TYPE ELECTRICAL MEASURING INSTRUMENT. Patent dated Apr. 15, 1947. Disclaimer filed June 24, 1948, by the assignee, *General Electric Company*.

Hereby enters this disclaimer of claim 2 of said patent.

[*Official Gazette August 10, 1948.*]